Figure 1:
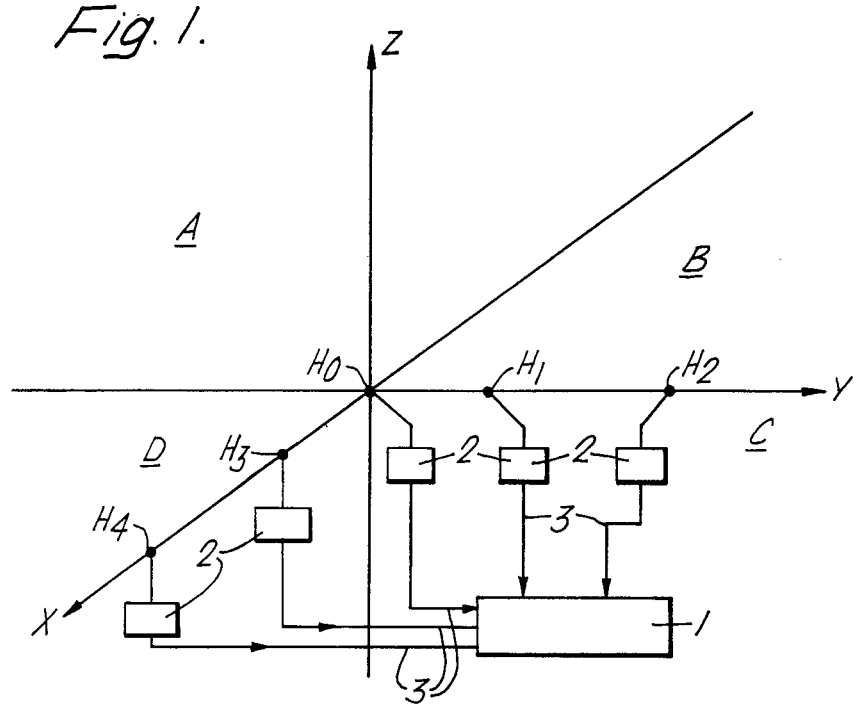

United States Patent [19]

Clare

[11] Patent Number: 4,622,657
[45] Date of Patent: Nov. 11, 1986

[54] ACOUSTIC DIRECTION FINDING SYSTEMS

[75] Inventor: Colin P. Clare, Buckinghamshire, England

[73] Assignee: McMichael Limited, England

[21] Appl. No.: 594,340

[22] Filed: Mar. 28, 1984

[51] Int. Cl.[4] ............................................. G01S 3/80
[52] U.S. Cl. .................................... 367/129; 367/124; 367/127
[58] Field of Search ............... 367/124, 127, 129, 118, 367/125, 907; 343/387, 394, 417, 424; 73/587

[56] References Cited

U.S. PATENT DOCUMENTS

| | | | |
|---|---|---|---|
| 3,383,690 | 5/1968 | Keller | 367/129 |
| 3,633,205 | 1/1972 | Lee et al. | 343/444 |
| 3,725,855 | 4/1973 | Murphree et al. | 367/127 |
| 3,859,621 | 1/1975 | Forman | 367/127 |

Primary Examiner—Thomas H. Tarcza
Assistant Examiner—Daniel T. Pihulic
Attorney, Agent, or Firm—Kirschstein, Kirschstein, Ottinger & Israel

[57] ABSTRACT

Hydrophone systems in which the direction of acoustic waves impinging on an array of hydrophones is determined from measurements of the periods between successive zero-crossings of waves detected by the two hydrophones of each several different pairs of the hydrophones, allowance being made for the fact that the start and finish of such a period may be due to zero-crossings of different waves. In one embodiment the hydrophones are arranged in two linear groups disposed at right angles to one another, with unequal spacing between adjacent pairs of hydrophones in each group. In another embodiment the hydrophone array consists of five hydrophones disposed at the corners of a regular pentagon.

8 Claims, 5 Drawing Figures

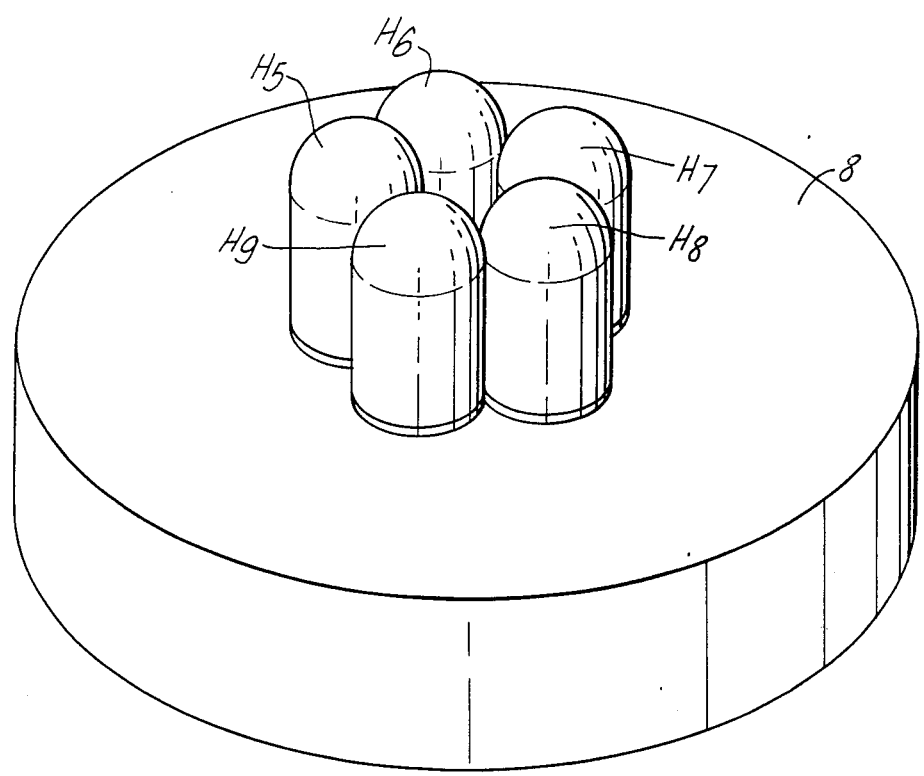

ACOUSTIC DIRECTION FINDING SYSTEMS

This invention relates to acoustic direction finding systems and to methods of operating same. More particularly, but not exclusively, the invention is concerned with hydrophone systems.

In a known form of hydrophone system, a plurality of hydrophones are equally spaced in a cruciform array, and the direction of waves impinging on the array is determined in dependence upon the periods between zero-crossings of the waves detected by different pairs of the hydrophones.

An object of the present invention is to provide an improved hydrophone system.

According to one aspect of the present invention, a method of operating an acoustic direction finding system which comprises an array of a plurality of spaced electro-acoustic transducers disposed in a plane to determine the direction of waves impinging on the array includes the steps of measuring the periods between successive instants of zero-crossings of waves detected by different pairs of transducers, comparing such periods in respect of different pairs of transducers, the ratio of the distances between the two transducers of such pairs being non-integral, and checking which comparisons correspond to the times for a wavefront to pass between the appropriate pairs of transducers being in the said ratio after due allowance has been made for the fact that at least one of said periods may be determined by transducers responding to different zero-crossings.

According to another aspect of the present invention, an acoustic direction finding system comprises an array of at least five electro-acoustic transducers disposed in two groups each having three transducers, one of which may be common to both groups, along two orthogonal lines in a plane, the ratio of the spacings between different pairs of transducers in each of the two groups being non-integral, and means responsive to periods between instants of zero-crossing of waves detected by said different pairs of transducers in the two groups, after allowance for the fact that said period may be determined by transducers responsive to different zero-crossings, for determining the quadrant in said plane emanating from the array in which lies the source of waves impinging thereon.

Preferably the ratio of the spacings of said different pairs of transducers in each group of 1.5.

According to yet another aspect of the invention, an acoustic direction finding system comprises an array of at least three electro-acoustic transducers which are disposed in a plane so that no three of the transducers are in a straight line and means for comparing the periods between instants of zero-crossing of waves detected by different pairs of said transducers and from such comparison and the disposition of the transducers verifying which periods are in respect of zero-crossings of the same wave and means for determining from said verified periods the direction in said plane of the source of waves impinging on the array.

In a preferred construction of the array, there are five transducers disposed at the corners of a regular pentagon.

Figure 4:
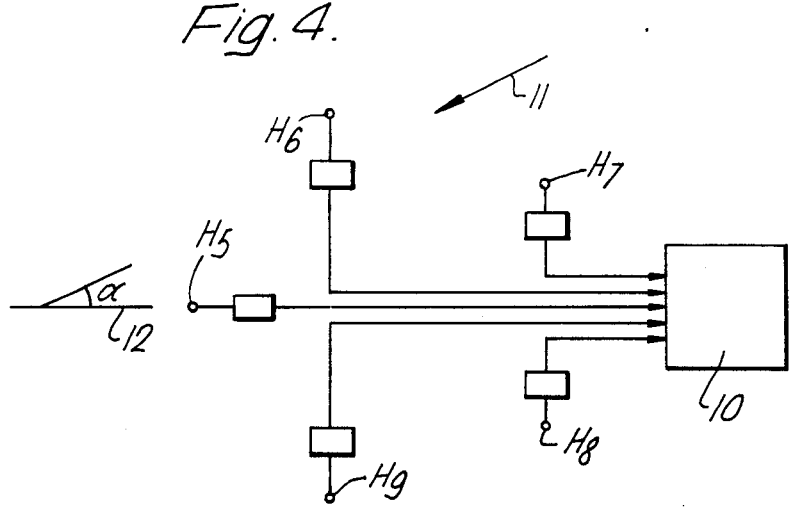
Figure 2:
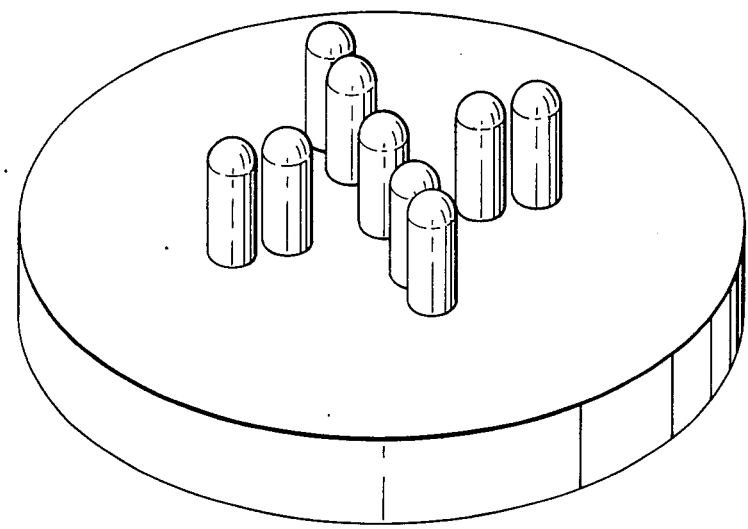
Figure 3:
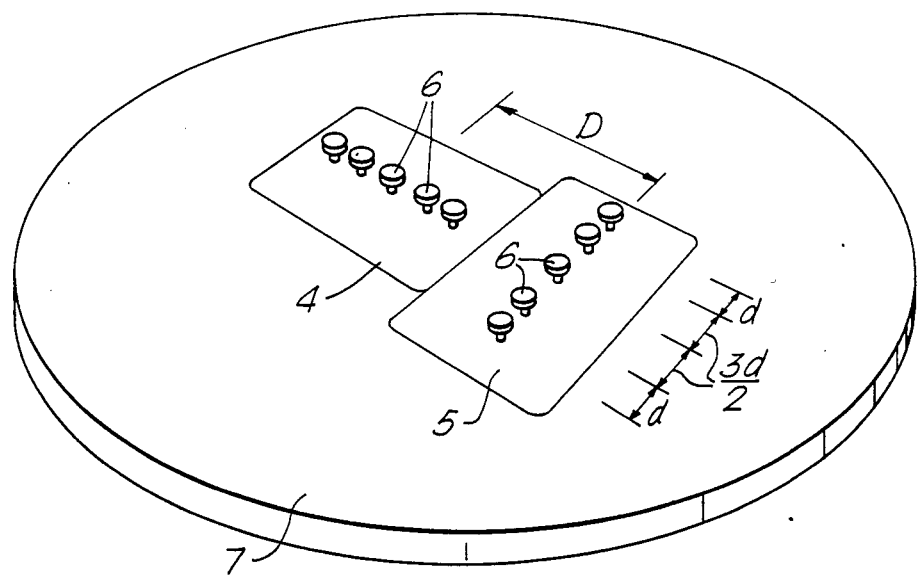

Examples of hydrophone systems and methods of operating same in accordance with the invention will now be described with reference to the five figures of the accompanying drawings in which:

FIG. 1 shows the first hydrophone system diagrammatically,

FIGS. 2 and 3 and perspective views of two alternative hydrophone arrays for use with the first system, FIG. 4 shows the second system diagrammatically, and FIG. 5 is a perspective view of the hydrophone array of the second system.

Referring to FIG. 1 of the accompanying drawings, the first hydrophone system comprises an array of five hydrophones, $H_0$, $H_1$, $H_2$, $H_3$ and $H_4$, each of which is a piezo-electric transducer such as the Bruel and Kjaer type 8103. The two groups of hydrophones $H_0$, $H_1$ and $H_2$ and $H_0$, $H_3$ and $H_4$ are disposed respectively in two orthogonal lines which can conveniently be considered the Y and X axes respectively of a cartesian reference system having its origin at the location of the hydrophone $H_0$. The two hydrophones $H_1$ and $H_3$ are spaced a distance d from the hydrophone $H_0$ while the pairs of hydrophones $H_1$, $H_2$ and $H_3$, $H_4$ are spaced a distance $3d/2$ apart.

Each of the five hydrophones $H_0$ and $H_4$ has associated electronic circuits 2 (of known form) for determining the instants of zero-crossing of acoustic wave impinging on the hydrophone and each such determination is signalled to a digital computer 1 over a path 3. It may be mentioned here that the hydrophone system can only be operated to obtain the direction (from the hydrophone array) of such a source of waves if the wavelength of these waves is not less than d.

During use of the hydrophone system, the individual hydrophones $H_0$ to $H_4$ respond to acoustic waves from a remote source in turn and the computer 1 is arranged to measure the delay between successive zero-crossings as follows:

| Delay | Between |
|---|---|
| $t_1$ | $H_0$ and $H_1$ |
| $t_2$ | $H_0$ and $H_3$ |
| $t_3$ | $H_1$ and $H_2$ |
| $t_4$ | $H_3$ and $H_4$ |

The computer 1 is also arranged to measure the period $\tau$ between successive zero-crossings of waves impinging on the hydrophone array. This measurement may conveniently be effected in respect of one hydrophone, say the hydrophone $H_0$, but, although this period should be the same for all the hydrophones of the array, it may be preferable to derive a value for $\tau$ as the mean time between zero-crossings of each of the hydrophones $H_0$ to $H_4$.

The hydrophones $H_0$ to $H_4$ are, in fact, carried on a solid member (not shown but the surface of which lies generally in the X-Y plane of FIG. 1) so that waves can only reach the hydrophone array from directions above the X-Y plane of the drawing.

From the measurements of $t_1$ to $t_4$ and $\tau$, the computer 1 is arranged to determine in which of the octants A, B, C or D lies the source of waves impinging on the hydrophone array as will now be described. For each of these octants there is a predetermined relationship between the measured times $t_1$ and $t_3$ and another predetermined relationship between the times $t_2$ and $t_4$ due to the geometry of the arrangement. In all cases there are however two possible relationships depending upon whether or not there is an intervening zero-crossing of the incoming waves between the hydrophones $H_1$ and H2 or between the hydrophones H3 and H4 as appropriate. It can be shown that these relationships are as follows:

| Octant A | Octant B |
|---|---|
| $t_3 = \begin{cases} 3t_1/2 \\ \text{or} \\ 3t_1/2 - \tau \end{cases}$ | $t_3 = \begin{cases} (3t_1 + \tau)/2 \\ \text{or} \\ (3t_1 - \tau)/2 \end{cases}$ |
| $t_4 = \begin{cases} 3t_2/2 \\ \text{or} \\ 3t_2/2 - \tau \end{cases}$ | $t_4 = \begin{cases} 3t_2/2 \\ \text{or} \\ 3t_2/2 - \tau \end{cases}$ |
| Octant D | Octant C |
| $t_3 = \begin{cases} 3t_1/2 \\ \text{or} \\ 3t_1/2 - \tau \end{cases}$ | $t_3 = \begin{cases} (3t_1 + \tau)/2 \\ \text{or} \\ (3t_1 - \tau)/2 \end{cases}$ |
| $t_4 = \begin{cases} (3t_2 + \tau)/2 \\ \text{or} \\ (3t_2 - \tau)/2 \end{cases}$ | $t_4 = \begin{cases} (3t_1 + \tau)/2 \\ \text{or} \\ (3t_1 - \tau)/2 \end{cases}$ |

It will be noted that these relationships are different for each of the four octants. Thus, if $t_3$ is equal to either $3t_1/2$ or $3t_1/2 - \tau$ it follows that the wave source must be in either octant A or D while if $t_4$ is equal to $3t_2/2$ or $3t_2/2 - \tau$ the source must be in either octant A or B. It is therefore strictly only necessary for the computer 1 to effect the calculations and comparisons just referred to in order to ascertain the appropriate octant but, in practice, it may be more satisfactory for the computer 1 to effect all the calculations and comparisons listed above and then to determine the octant in which the wave source lies on a 'best fit' basis.

It may be mentioned that, if the hydrophone array had been responsive to waves from either side of the X-Y plane, the relationships just discussed could be utilised to determine the quadrant about the Z axis (in effect two octants one on either side of the X-Y plane) in which the wave source lies.

Reverting to the four octant case, it can be shown that, if the direction of wave source measured from the hydrophone array, makes angles $\theta_\alpha$ and $\theta_\beta$ to the X and Y axis in the X-Z and Y-Z planes respectively, these angles are given by the following expressions:

| Octant A | Octant B |
|---|---|
| $\theta_\alpha = \begin{cases} 180 - \cos^{-1}(t_2/t_d) \\ 180 - \cos^{-1}(2t_4/3t_d) \\ 180 - \cos^{-1}(2(t_4 + \tau)/3t_d) \end{cases}$ | $\theta_\alpha = \begin{cases} 180 - \cos^{-1}(t_2/t_d) \\ 180 - \cos^{-1}(2t_4/3t_d) \\ 180 - \cos^{-1}(2(t_4 + \tau)/3t_d) \end{cases}$ |
| $\theta_\beta = \begin{cases} 180 - \cos^{-1}(t_1/t_d) \\ 180 - \cos^{-1}(2t_3/3t_d) \\ 180 - \cos^{-1}(2(t_3 + \tau)/3t_d) \end{cases}$ | $\theta_\beta = \begin{cases} \cos^{-1}((\tau - t_1)/t_d) \\ \cos^{-1}(2(\tau - t_3)/3t_d) \\ \cos^{-1}(2(2\tau - t_3)/3t_d) \end{cases}$ |
| Octant D | Octant C |
| $\theta_\alpha = \begin{cases} \cos^{-1}((\tau - t_2)/t_d) \\ \cos^{-1}(2(\tau - t_4)/3t_d) \\ \cos^{-1}(2(2\tau - t_4)/3t_d) \end{cases}$ | $\theta_\alpha = \begin{cases} \cos^{-1}((\tau - t_2)/t_d) \\ \cos^{-1}(2(\tau - t_4)/3t_d) \\ \cos^{-1}(2(2\tau - t_4)/3t_d) \end{cases}$ |
| $\theta_\beta = \begin{cases} 180 - \cos^{-1}(t_1/t_d) \\ 180 - \cos^{-1}(2t_3/3t_d) \\ 180 - \cos^{-1}(2(t_3 + \tau)/3t_d) \end{cases}$ | $\theta_\beta = \begin{cases} \cos^{-1}\dfrac{(\tau - t_1)}{t_d} \\ \cos^{-1}(2(\tau - t_3)/3t_d) \\ \cos^{-1}(2(2\tau - t_3)/3t_d) \end{cases}$ | where $t_d$ is the time taken for a wavefront to traverse the distance $\underline{d}$ in its direction of propagation.

Having first established the octant in which the wave source lies (as previously described), the computer 1 proceeds to calculate the value of each of the angles $\theta_\alpha$ and $\theta_\beta$ using the one of the alternative formulae which is likely to give the most accurate answer and a value of $t_d$ equal to the time taken for a wavefront to travel the distance d in water, due correction to the velocity of sound in water being given for the temperature, pressure and salinity of the water.

In practice, it may be convenient for the array to have four additional hydrophones with the total of nine hydrophones disposed in a symmetrical cruciform array centered on the hydrophone $H_0$, such an arrangement providing some redundant information but at the same time improving the overall performance of the system. Furthermore the spacing of the three hydrophones in each arm of the array may be changed, without affecting the basis of the determinations and calculations previously described, so that the spacing between the central hydrophone (corresponding to $H_0$) and the adjacent hydrophone (corresponding to $H_1$ or $H_3$) in each arm is 1.5 times the spacing between the two outer hydrophones of each arm. Such a hydrophone array is shown in FIG. 2 of the accompanying drawings.

In the cruciform array of hydrophones, some hydrophones may be subject to acoustic shadowing by adjacent hydrophones. This can be reduce by having an array of 'T' configuration which is otherwise utilized in the same way as previously described. Such an array is shown in FIG. 3 of the drawings and comprises two like modules 4 and 5 each having five sub-miniature hydrophones 6 mounted on a steel plate 7, the distance D between the centres of the two modules 4 and 5 being not more than a few wavelengths at the frequency of use.

Referring now to FIGS. 4 and 5 of the accompanying drawings, the second form of hydrophone system to be described comprises five hydrophones $H_5$ to $H_9$ which are located at the corners of a regular pentagon. The hydrophones $H_5$ to $H_9$ are mounted on a steel plate 8. Again the instants of zero-crossings of waves impinging on the hydrophones $H_5$ to $H_9$ are detected by circuits 9 and signalled to a digital computer 10.

In this embodiment of the invention, the computer 10 is arranged to store information identifying the times of occurrence (relative to an arbitrary reference) of at least the first, second and third zero-crossings detected by each of the five hydrophones $H_5$ to $H_9$ after the commencement of a computation sequence to ascertain the direction of a source of waves impinging on the array. From this information, the computer 10 calculates and stores the periods between each of the first zero-crossings detected by each of the hydrophones $H_5$ to $H_9$ and each of the first, second and third zero-crossings detected by each of the other hydrophones. One example of the periods so calculated is that between the first zero-crossing detected by the hydrophone $H_5$ and the first zero-crossing detected by the hydrophone $H_7$ while another example is the period between the first zero-crossing detected by the hydrophone H₆ and the third zero-crossing detected by the hydrophone H₉.

It will be appreciated from the geometry of the hydrophone array that the time taken for any given wavefront to pass from hydrophone H₅ to hydrophone H₈ will always be in a fixed ratio of sin 54° (approximately 1.618) to the time taken for the same wavefront to pass from the hydrophone H₆ to the hydrophone H₇. There are, in fact, a total of ten such ratios for different pairs of hydrophones and, to ascertain the direction in which the source lies, the computer 10 compares successive pairs of said periods to determine which of them (after due allowance has been made for any intervening zero-crossings by virtue of knowledge of the wave period $\tau$) are in accordance with one of the fixed ratios. This involves a total of ninety calculations.

Under ideal conditions, ten of the calculations just referred to should give the appropriate fixed ratio, thereby verifying that the time-difference measurements involved are in respect of the same wavefront, although in practice it is not uncommon for a lesser number of such verifications to be effected.

Once the time-difference measurement in respect of a pair of the hydrophones H₅ to H₉ has been verified, the direction of the source is calculated by the computer from the verified measurement. For example, assuming the time difference t between the first zero-crossing detected by the hydrophone H₆ and the first zero-crossing detected by the hydrophone H₉ has been verified in respect of waves arriving in the direction of the arrow 11 and remembering that the distance between the hydrophones H₆ and H₉ is 1.618d, where d is the distance between adjacent hydrophones, it follows that the direction of the source is at an angle $\alpha$ to a datum line 12 through the hydrophone array as given by the following expression:

$$\sin \alpha = ct/1.62d$$

where c is the velocity of sound in water (after correction as in the first example described above).

It will be appreciated that waves emanating from the direction $180 - \alpha$ will give the same time difference measurement and, to remove this ambiguity and give a unique solution it is necessary for a similar calculation to be effected in respect of another verified time-difference measurement.

The construction of hydrophone array described above the reference to FIGS. 4 and 5 has the advantage that, unlike a linear array, it enables the hydrophone system to operate at wavelengths significantly less than the minimum physical spacing of the hydrophone. This is an important consideration if the spacing is comparable to the actual size of each hydrophone so that the spacing cannot be further reduces to extend the bandwidth.

When operating any of the hydrophone systems described above in an environment having a poor signal to noise ratio, it is necessary first to verify that a "good" signal is present. A number of threshold tests for achieving this have previously been proposed. For example the computer may be arranged, in response to zero-crossings detected by one of the hydrophones of the array, to determine the magnitude of the quantity $\tau - \bar{\tau}$, where $\tau$ has the meaning previously ascribed herein and $\bar{\tau}$ is the mean value of $\tau$ taken over a large number of zero-crossings (preferably weighted to favour more recent measurements), the computer being arranged only to perform the direction-finding calculations if this magnitude has less than a predetermined value.

I claim:

1. A method of operating an acoustic direction finding system which comprises an array of electro-acoustic transducers disposed in a plane to determine the direction of waves impinging on the array including steps of measuring periods between successive instants of zero-crossings of waves detected by two transducers of each of several different pairs of transducers, comparing such periods in respect of different pairs of transducers, a ratio of the distances between two transducers of such pairs being non-integral, and checking which comparisons correspond to times for a wavefront to pass between the appropriate pairs of transducers being in the said ratio after due allowance has been made for the fact that at least one of said periods may be determined by transducers responding to different zero-crossings.

2. A method according to claim 1 wherein said array of transducers comprises at least five transducers disposed in two groups each having three transducers, one of which may be common to both groups, along two orthogonal lines in the plane and the results of said checking determining a quadrant in said plane emanating from the array in which lies the source of waves impinging between thereon.

3. A method according to claim 1 wherein said array of transducers comprises at least three transducers disposed so that no three of the transducers are in a straight line and the method includes a further step of determining from a measured period which has been verified by being checked as aforesaid the direction in said plane in which lies the source of waves impinging on the array.

4. An acoustic finding system comprising an array of at last five electro-acoustic transducers disposed in two groups each having three transducers, one of which may be common to both groups, along two orthogonal lines in a plane, a ratio of spacings between different pairs of transducers in each of the two groups being non-integral, and means responsive to periods between instants of zero-crossing of waves detected by two transducers of each of several said different pairs of transducers in the two groups, after allowance for the fact that said period may be determined by transducers responsive to different zero-crossings, for determining the quadrant in said plane emanating from the array in which lies the source of waves impinging thereon.

5. A direction finding system according to claim 4 wherein the ratio of the spacings of said different pairs of transducers is 1.5.

6. An acoustic direction finding system comprising an array of at least three electro-acoustic transducers which are disposed in a plane so that no three of the transducers are in a straight line and means for comparing periods between instants of zero-crossing of waves detected by two tranducers of each of several different pairs of said transducers and from such comparison and the disposition of the transducers verifying which periods are in respect of zero-crossings of a same wave and means for determining from said verified periods the direction in said plane of the source of waves impinging on the array.

7. A direction finding system according to claim 6 wherein the array has five transducers disposed at the corners of a regular pentagon.

8. A system according to any one of claims 4-7, which may be deployed as a hydrophone system.

* * * * *